United States Patent
Takagi et al.

[11] Patent Number: 6,076,593
[45] Date of Patent: Jun. 20, 2000

[54] METHOD OF AND APPARATUS FOR CONTROLLING VEHICULAR AIR-CONDITIONING SYSTEM

[75] Inventors: Masahiro Takagi, Dublin, Ohio; Hiroshi Iwami, Utsunomiya, Japan; Masashi Tsuneishi, Tochigi-ken, Japan; Makoto Kobayashi, Tochigi-ken, Japan; Masahiro Kimishima, Tochigi-ken, Japan; Hiroshi Echigoya, Utsunomiya, Japan

[73] Assignee: Honda Giken Kogyo Kabushiki Kaisha, Tokyo, Japan

[21] Appl. No.: 09/069,150

[22] Filed: Apr. 29, 1998

[30] Foreign Application Priority Data

Apr. 30, 1997 [JP] Japan ................................ 9-112079

[51] Int. Cl.⁷ .................................................. B60H 3/00
[52] U.S. Cl. ........................... 165/43; 165/202; 165/201; 237/12.3 C; 219/209
[58] Field of Search ................................ 165/42, 43, 200, 165/201, 202; 237/12.3 C; 219/209

[56] References Cited

U.S. PATENT DOCUMENTS

| | | | |
|---|---|---|---|
| 4,927,077 | 5/1990 | Okada | 237/12.3 C X |
| 5,063,513 | 11/1991 | Shank et al. | 237/12.3 C X |

FOREIGN PATENT DOCUMENTS

| | | | |
|---|---|---|---|
| 0306916 | 12/1988 | Japan | 237/12.3 C |
| 403167026 | 7/1991 | Japan | 237/12.3 C |
| 404342613 | 11/1992 | Japan | 237/12.3 C |
| 405096934 | 4/1993 | Japan | 237/12.3 C |
| 406293211 | 10/1994 | Japan | 237/12.3 C |
| 08197937 | 8/1996 | Japan | |

Primary Examiner—Christopher Atkinson
Attorney, Agent, or Firm—Birch, Stewart, Kolasch & Birch, LLP

[57] ABSTRACT

A control apparatus controls a vehicular air-conditioning system to control a fuel-combustion heater for producing combustion heat to heat a heating medium in a heating medium circuit which heats air flowing through a duct having air outlets openable into a passenger compartment, through heat exchange between the heating medium and the air with a heat exchanger disposed in the duct. The control apparatus has a shutdown controller for temporarily shutting down the fuel-combustion heater and an extinguishing controller for extinguishing the fuel-combustion heater based on a signal from the shutdown controller. The shutdown controller includes a shutdown signal entering unit for entering a shutdown signal to temporarily shut down the fuel-combustion heater and a shutdown signal canceler for canceling the shutdown signal in response to a canceling signal entered to cancel the shutdown of the fuel-combustion heater within a predetermined period of time after the shutdown signal has been entered. Even if an erroneous attempt is made to turn off the fuel-combustion heater, the fuel-combustion heater can quickly and reliably resume its operation to heat the passenger compartment.

8 Claims, 7 Drawing Sheets

METHOD OF AND APPARATUS FOR CONTROLLING VEHICULAR AIR-CONDITIONING SYSTEM

BACKGROUND OF THE INVENTION

1. Field of the Invention

The present invention relates to a method of and an apparatus for controlling a vehicular air-conditioning system to control a fuel-combustion heater for producing combustion heat to heat a heating medium in a heating medium circuit which heats air flowing through a duct through a heat exchange between the heating medium and the air.

2. Description of the Related Art

Many air-conditioning principles are employed to air-condition the passenger compartment of a vehicle. One air-conditioning system is of the air reheating type which heats cool air that has been dehumidified by an evaporator by passing the cool air through a heater core, and discharges temperature-controlled air and humidity-controlled air from respective outlets into the passenger's compartment. According to an air-mixing-type design, cool air that has passed through an evaporator is divided by an air-mixing damper into air to pass through a heater core and air to bypass the heater core, and hot air and cool air are mixed downstream of the heater core and discharged through respective outlets into the passenger's compartment.

Air-conditioning systems for use on electric vehicles cannot use a heating medium in the form of cooling water which would otherwise be heated by cooling internal combustion engines. Japanese laid-open patent publication No. 8-197937 discloses an air-conditioning system which is capable of providing a sufficient heating capability and uses an existing heater unit, for use on an electric vehicle.

The disclosed air-conditioning system has a duct for passing air therethrough into a passenger's compartment, wherein the air-conditioning system operates selectively in a refrigerating cycle which involves an air blower for delivering air through the duct into the passenger's compartment, a coolant compressor for compressing and discharging a coolant, a coolant-water heat exchanger for heating hot water through heat exchange between the compressed coolant discharged from the coolant compressor and the hot water, and a coolant evaporator for cooling air with the heat of evaporation of the coolant, and in a hot-water cycle which involves a pump for circulating the hot water heated by the coolant-water heat exchanger and a hot-water heater disposed in the duct for heating air flowing through the duct with the hot water flowing from the coolant-water heat exchanger. The hot-water cycle also involves a fuel-combustion heater, connected in series with the hot-water heater, for heating the hot water with heat generated when a fuel is combusted, in order to obtain a sufficient heating capability in cold climates.

The fuel-combustion heater is basically controlled in three modes, i.e., an igniting mode, a combustion ability switching mode (mode of normal heating operation), and an extinguishing mode. Usually, the fuel-combustion heater switches from the igniting mode to the combustion ability switching mode to the extinguishing mode. If the passenger wants to turn off the fuel-combustion heater while it is operating in the combustion ability switching mode, then the passenger presses an "OFF" switch or an "AUX HTR OFF" switch on the air-conditioner control panel to cause the fuel-combustion heater to enter the extinguishing mode for thereby switching off the fuel-combustion heater.

Even if the passenger presses the "OFF" switch or the "AUX HTR OFF" switch by mistake, the fuel-combustion heater switches from the combustion ability switching mode to the extinguishing mode, and is turned off. Therefore, when the passenger presses an "AUTO" switch on the air-conditioner control panel to start heating the hot water with the fuel-combustion heater, it takes a considerable period of time until the fuel-combustion heater switches from the igniting mode to the combustion ability switching mode. Before the fuel-combustion heater operates in the combustion ability switching mode, the temperature in the passenger compartment drops to such a level that the passenger will feel too cold in the passenger compartment.

SUMMARY OF THE INVENTION

It is therefore an object of the present invention to provide a method of and an apparatus for controlling a vehicular air-conditioning system to quickly resume operation of a fuel-combustion heater even when a vehicle passenger turns off the fuel-combustion heater by mistake, for reliably preventing the temperature of a passenger compartment from unduly dropping.

The above and other objects, features, and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
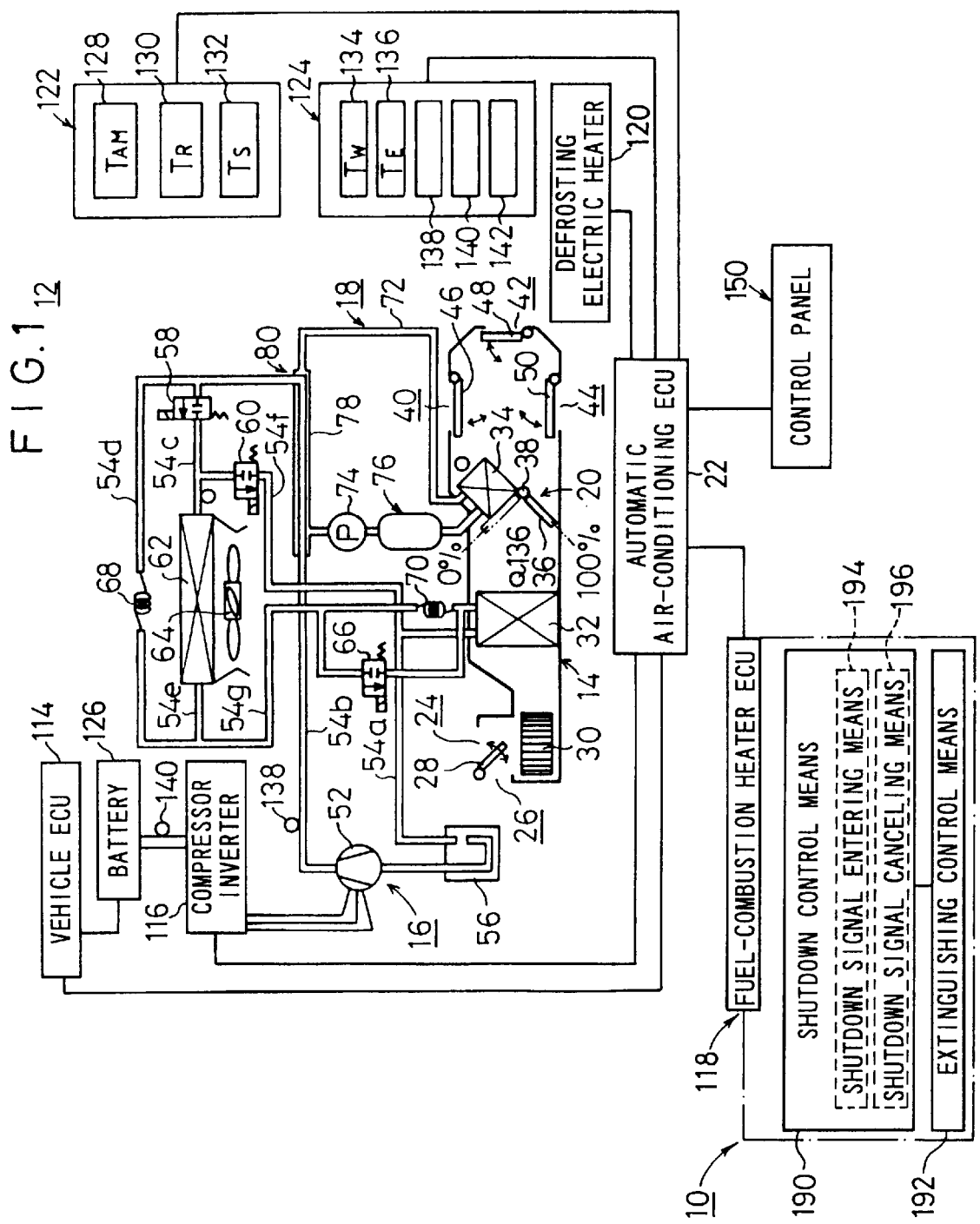
FIG. 1 is a schematic view, partly in block form, of an automatic air-conditioning system for use on an electric vehicle, to which a control apparatus according to the present invention is applied.

FIG. 1 schematically shows, partly in block form, an automatic air-conditioning system 12 for use on an electric vehicle, to which a control apparatus 10 according to the present invention is applied.

As shown in FIG. 1, the automatic air-conditioning system 12 has a duct 14 for discharging temperature-controlled and humidity-controlled air into the passenger's compartment of the electric vehicle, a cooling medium circuit 16 for cooling the air flowing through the duct 14 through heat exchange between the air and a coolant, a heating medium circuit 18 for heating the air flowing through the duct 14 through heat exchange between the air and hot water (heating medium), an air-mixing unit 20 disposed in the duct 14 for mixing and controlling cool air and hot air, and an automatic air-conditioning ECU 22 for controlling operation of various units including the air-mixing unit 20.

The duct 14 is disposed in front of the passenger compartment with an instrumental panel (not shown) interposed therebetween. The duct 14 has on its upstream end an interior air inlet 24 for introducing air from an interior space in the passenger compartment and an exterior air inlet 26 for introducing from an exterior space outside of the passenger compartment, the interior air inlet 24 and the exterior air inlet 26 being selectively openable and closable by a switching damper 28.

In the duct 14, there are disposed an air blower 30 closely to the switching damper 28 and an evaporator 32 positioned downstream of the air blower 30, the evaporator 32 being part of the cooling medium circuit 16. The duct 14 also houses therein a heater core (heat exchanger) 34 disposed downstream of the evaporator 32, the heater core 34 being part of the heating medium circuit 18. The air-mixing unit 20 is mounted on an inlet side of the heater core 34. The air-mixing unit 20 has an air-mixing damper 36 which can be angularly moved to any desired angular position within an angular range from an angular extent 0% to an angular extent 100% by an air-mixing motor 38 coupled to the air-mixing damper 36.

The duct 14 has in its downstream end portion a defrosting outlet 40 for discharging air against the inner surface of a front windshield of the electric vehicle, a face outlet 42 for discharging air against the head of a passenger in the passenger's compartment, and a foot outlet 44 for discharging air against the feet of the passenger. The defrosting outlet 40, the face outlet 42, and the foot outlet 44 are associated respectively with a defrosting damper 46, a face damper 48, and a foot damper 50 which are angularly movable to open and close the defrosting outlet 40, the face outlet 42, and the foot outlet 44, respectively.

These outlets 40, 42, 44 operate selectively in various modes including a "DEF" mode in which the defrosting outlet 40 is selectively opened and closed by the defrosting damper 46, a "FOOT" mode in which the foot outlet 44 is selectively opened and closed by the foot damper 50, a "FOOT/DEF" mode in which the defrosting outlet 40 and the foot outlet 44 are selectively opened and closed by the defrosting damper 46 and the foot damper 50, a "VENT" mode (or "FACE" mode) in which the face outlet 42 is selectively opened and closed by the face damper 48, and a "B/L" mode in which the face outlet 42 and the foot outlet 44 are selectively opened and closed by the face damper 48 and the foot damper 50.

The evaporator 32 serves to evaporate a cooling medium flowing into the evaporator 32 and also to cool air which is introduced into the duct 14 by the air blower 30, through heat exchange between the air and the cooling medium. The cooling medium circuit 16 which includes the evaporator 32 includes a compressor 52 having an inlet port connected to an outlet port of the evaporator 32 by a cooling medium pipe 54a which has an accumulator 56. The compressor 52 compresses the cooling medium (gas coolant), drawn thereinto through the inlet port thereof, and it discharges a high-temperature, high-pressure cooling medium from an outlet port thereof into a cooling medium pipe 54b. The accumulator 56 separates the cooling medium into a liquid coolant and a gas coolant, and it supplies only the gas coolant to the compressor 52.

The cooling medium pipe 54b has an end portion branched into cooling medium pipes 54c, 54d, and the cooling medium pipe 54c is branched into cooling medium pipes 54e, 54f. The cooling medium pipe 54c has a first solenoid-operated valve 58, and the cooling medium pipe 54f has a second solenoid-operated valve 60. The cooling medium pipe 54f is connected to the cooling medium pipe 54a. The cooling medium pipe 54e has an exterior heat exchanger 62 which serves to evaporate a low-temperature, low-pressure cooling medium in a gas-liquid phase through heat exchange between the cooling medium and exterior air applied by an exterior fan 64 when the automatic air-conditioning system 12 operates in a heating mode to heat the passenger's compartment, and also to condense a high-temperature, high-pressure gas coolant into a liquid through heat exchange between the gas coolant and exterior air applied by the exterior fan 64 when the automatic air-conditioning system 12 operates in a cooling mode to cool the passenger compartment.

The cooling medium pipe 54d has a first capillary tube 68 to be used for heating. The cooling medium pipes 54d, 54e are joined into a cooling medium pipe 54g which is connected to the inlet port of the evaporator 32. In the cooling medium pipe 54g, a third solenoid-operated valve 66 and a second capillary tube 70 used for cooling are provided in parallel to each other.

The heating medium circuit 18 includes a hot-water circulation pipe 72 for circulating and supplying hot water to the heater core 34, the hot-water circulation pipe 72 having a water pump 74 and a fuel-combustion heater 76 for generating heat by combusting a fuel. The fuel-combustion heater 76 is controlled in three modes, i.e., an igniting mode, a combustion ability switching mode (mode of normal heating operation), and an extinguishing mode. The hot-water circulation pipe 72 includes an outer conduit 78 disposed around and extending a certain length along a portion of the cooling medium pipe 54b of the cooling medium circuit 16. The cooling medium pipe 54b and the outer conduit 78 jointly provide a double-walled medium heat exchanger 80. When the high-temperature, high-pressure cooling medium discharged from the compressor 52 flows through the cooling medium pipe 54b, the medium heat exchanger 80 heats hot water flowing as a heating medium in the outer conduit 78 of the hot-water circulation pipe 72 through heat exchange between the heating medium and the cooling medium from the compressor 52.

Figure 2:
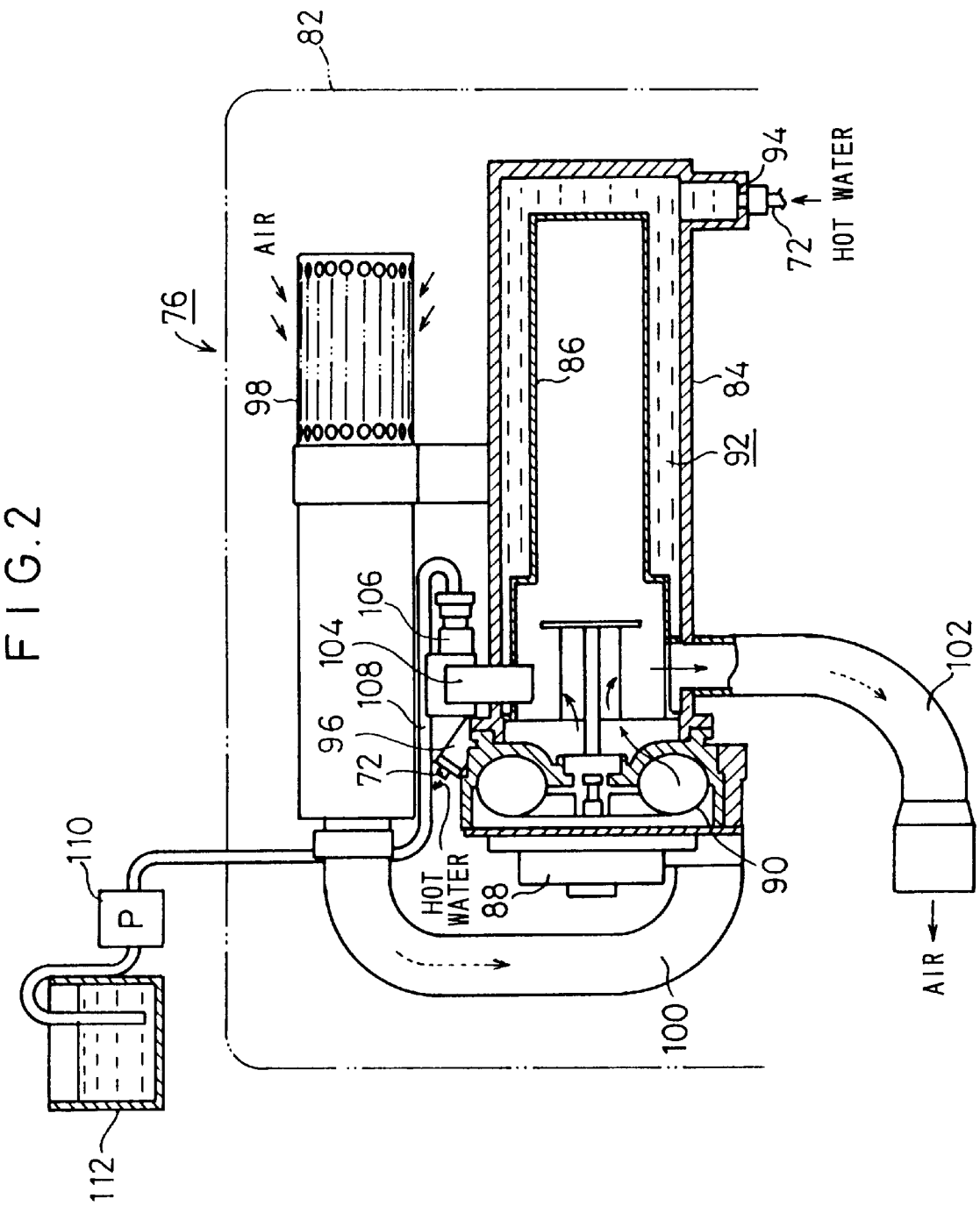
FIG. 2 is a vertical cross-sectional view of a fuel-combustion heater of the automatic air-conditioning system.

As shown in FIG. 2, the fuel-combustion heater 76 comprises a substantially cylindrical heater case 84 housed in a cover 82 and having a closed end. The heater case 84 houses a substantially cylindrical combustion tube 86 disposed coaxially therein and having a closed end. The heater case 84 has an open end on which an air blower 90 coupled to a motor unit 88 is mounted.

Between the heater case 84 and the combustion tube 86, there is defined a heat exchange passage 92 communicating with a hot water inlet port 94 and a hot water outlet port 96 which are defined in the heater case 84. An inlet pipe 100 has an end connected to the air blower 90 and an opposite end connected to a silencer 98. An exhaust pipe 102 for discharging exhaust gases is connected to the heater case 82 near its open end.

A glow plug 104 for igniting the fuel when the automatic air-conditioning system 12 is started is mounted on the heater case 84 near the air blower 90. The glow plug 104 is connected to a fuel pipe 108 through a one-way valve 106. The fuel pipe 108 is connected to a fuel tank 112 through a fuel pump 110. The fuel tank 112 contains kerosene, white gasoline, gas oil, or the like. The hot water inlet pot 94 and the hot water outlet port 96 of the heater case 84 are connected to the hot-water circulation pipe 72.

As shown in FIG. 1, to the automatic air-conditioning ECU 22, there are connected a vehicle ECU 114, a compressor inverter 116, a fuel-combustion heater ECU 118, a defrosting electric heater 120, an environmental condition detector 122, and an operating condition detector 124. The vehicle ECU 114 and the compressor inverter 116 are supplied with electric energy from a battery 126, and the compressor inverter 116 is connected to the compressor 52.

The environmental condition detector 122 includes an ambient air temperature sensor 128 for detecting an ambient air temperature $T_{AM}$, a passenger compartment temperature sensor 130 for detecting a passenger compartment temperature $T_R$, and a sunlight intensity sensor 132 for detecting a sunlight intensity $T_S$ (kcal/m$^2$min). The operating condition detector 124 includes a water temperature sensor 134 for detecting the temperature $T_W$ of hot water flowing through the heater core 34, an air temperature sensor 136 for detecting the temperature $T_E$ of air discharged from the evaporator 32, a pressure sensor 138 for detecting the pressure of the cooling medium discharged from the compressor 52, a current sensor 140 for detecting a current from the battery 126, and a cooling medium temperature sensor 142 for detecting the temperature of the cooling medium near the exterior heat exchanger 62.

Basically, the automatic air-conditioning ECU 22 can perform a function as a calculating means for calculating a target discharged-air temperature $T_{AO}$ based on inputted environmental conditions including the passenger's compartment temperature $T_R$ and ambient air temperature $T_{AM}$, and a desired temperature setting $T_{SET}$, a function as an operation mode selecting means for selecting one of operation modes including a cooling mode, an air blowing mode, and a heating mode based on the target discharged-air temperature $T_{AO}$, and a function to control the various components included in the entire automatic air-conditioning system 12.

Figure 3:
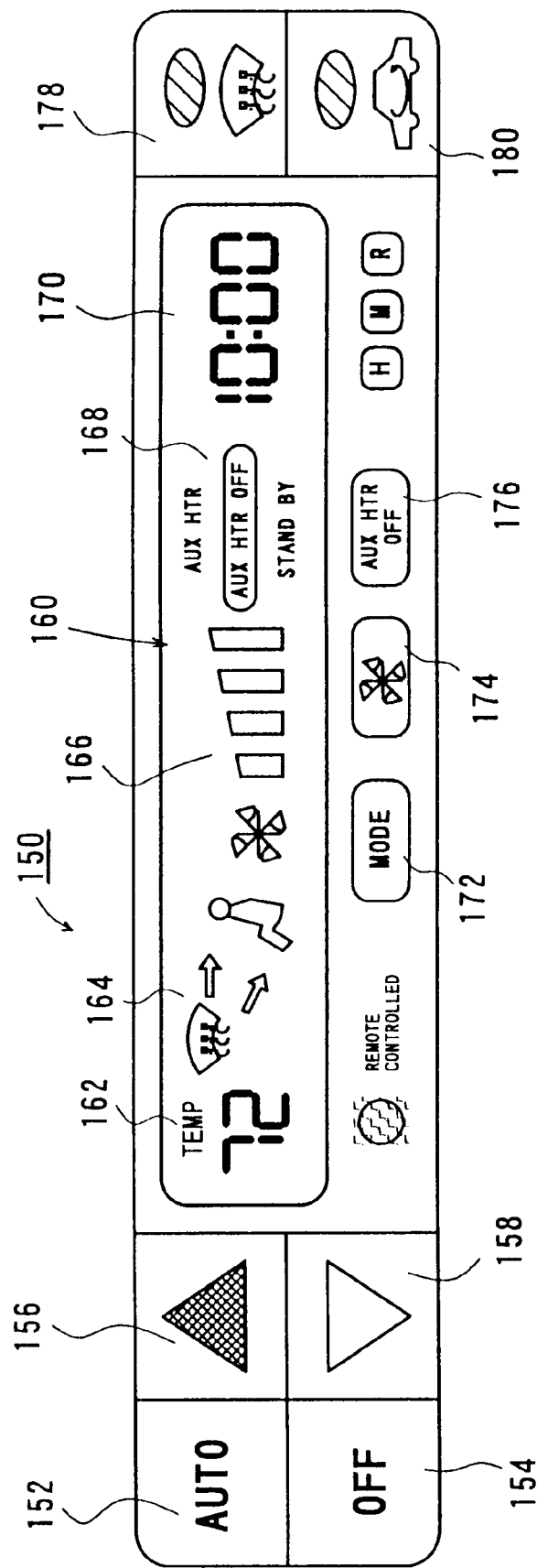
FIG. 3 is a front elevational view of a control panel of the automatic air-conditioning system.

To the automatic air-conditioning ECU 22, there is connected a control panel 150 which, as shown in FIG. 3, has an "AUTO" switch 152 for starting to energize the automatic air-conditioning system 12, an "OFF" switch 154 for turning off the entire operation of the automatic air-conditioning system 12, and temperature increasing and lowering switches 156, 158 disposed respectively adjacent to the "AUTO" switch 152 and the "OFF" switch 154 which are disposed at upper and lower positions at the felt end of the control panel 150 as shown in FIG. 3.

The control panel 150 also has a longitudinally elongate display unit 160 disposed substantially centrally therein. The display unit 160 includes a temperature display area 162, an outlet mode display area 164, an air flow intensity display area 166, a fuel-combustion heater status display area 168, and a time display area 170. The fuel-combustion heater status display area 168 includes a display message "STAND BY" indicating that the fuel-combustion heater 76 is in the igniting mode or the extinguishing mode other than the combustion ability switching mode.

The control panel 150 also has, beneath the display unit 160, an outlet mode selector switch 172, an air flow intensity selector switch 174, and a fuel-combustion heater stop switch (hereinafter referred to as an "AUX HTR OFF" switch) 176. The control panel 150 further includes a defrosting electric heater switch 178 and an air circulation/introduction selector switch 180 which are disposed at upper and lower positions at the right end of the control panel 150.

As shown in FIG. 1, the control apparatus 10 comprises a shutdown control means 190 for temporarily shutting down the fuel-combustion heater 76 and an extinguishing control means 192 for extinguishing the fuel-combustion heater 76 based on a signal from the shutdown control means 190. The shutdown control means 190 and the extinguishing control means 192 are essentially contained as functions of the fuel-combustion heater ECU 118.

The shutdown control means 190 performs a function as a shutdown signal entering means 194 for entering a shutdown signal to temporarily shut down the fuel-combustion heater 76 and a function as a shutdown signal canceling means 196 for canceling the shutdown signal in response to a canceling signal entered to cancel the shutdown of the fuel-combustion heater 76 within a predetermined period of time after the shutdown signal has been entered.

Operation of the automatic air-conditioning system 12 under the control of the control apparatus 10 will be described below.

Figure 4:
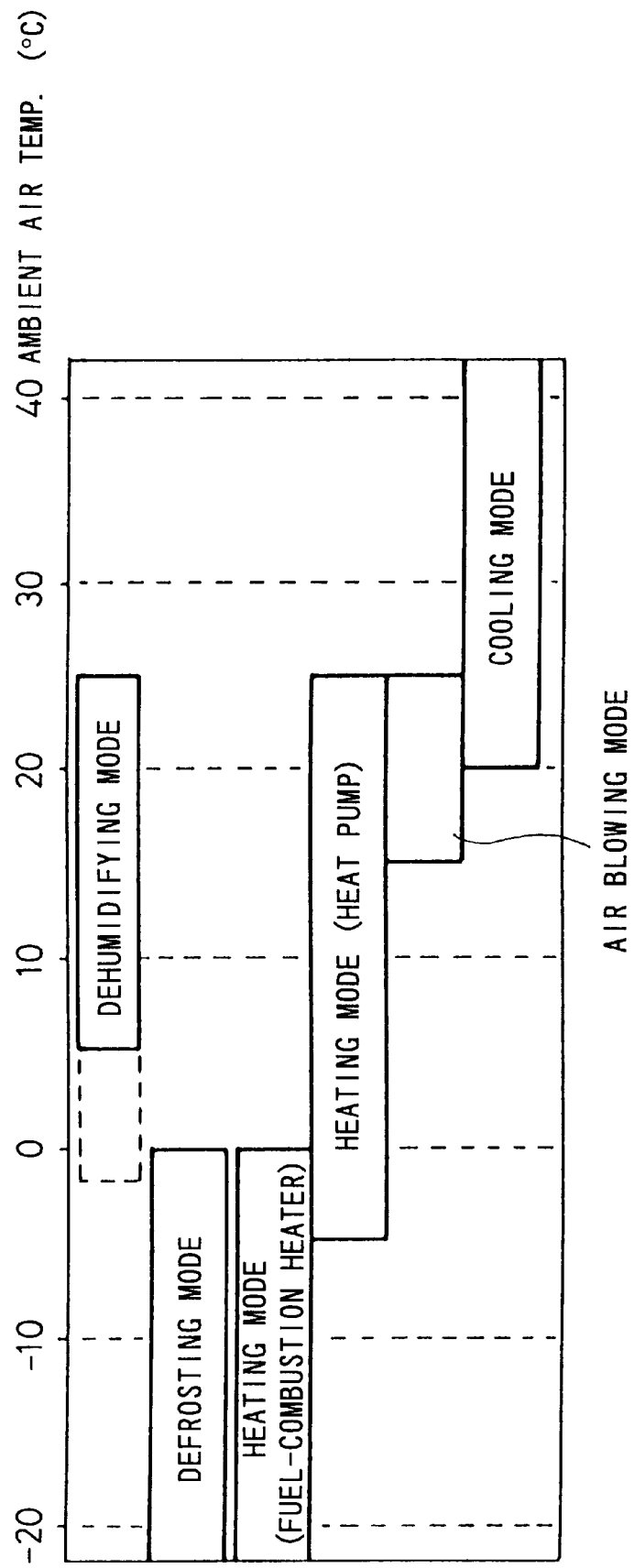
FIG. 4 is a diagram showing the relationship between various modes of operation of the automatic air-conditioning system and temperature ranges for the respective modes of operation.

The states of various components of the cooling medium circuit 16 when the automatic air-conditioning system 12 is in a cooling mode, a heating mode (carried out by a heat pump), a heating mode (carried out by the fuel-combustion heater), a dehumidifying mode, and an air blowing mode are shown in Table 1 given below, and the relationship between these modes of operation of the automatic air-conditioning system 12 and ambient air temperature ranges for the respective modes of operation are shown in FIG. 4.

TABLE 1

| Mode of operation | Cooling | Heating *1 | Heating *2 | Dehumi- difying | Air blowing |
|---|---|---|---|---|---|
| Solenoid-operated valve 58 | Open | Closed | Closed | Closed | Closed |
| Solenoid-operated valve 60 | Closed | Open | Closed | Closed | Closed |
| Solenoid-operated valve 66 | Closed | Closed | Closed | Open | Closed |
| Capillary tube 68 | — | Through | — | Through | — |
| Exterior heat exchanger 62 | Through | Through | — | — | — |
| Capillary tube 70 | Through | — | — | — | — |
| Evaporator 32 | Through | — | — | Through | — |
| Water pump 74 | Off | On | On | On | Off |
| Compressor 52 | On | On | Off | On | Off |

*1: Heat pump
*2: Fuel-combustion heater

Figure 5:
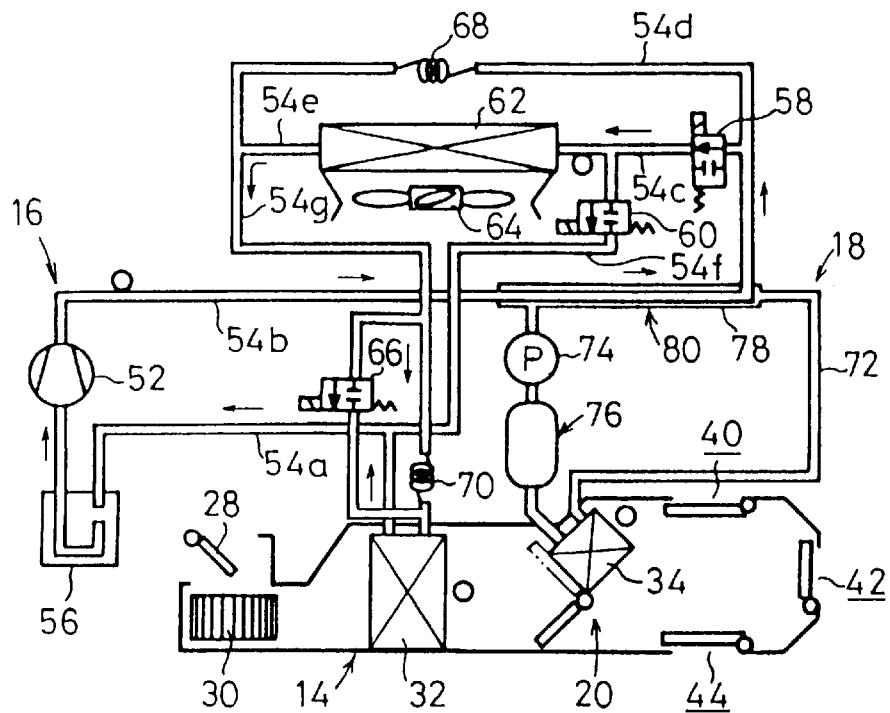
FIG. 5 is a schematic view illustrative of a cooling mode of the automatic air-conditioning system.

In the cooling mode, as shown in Table 1 and FIG. 5, the first solenoid-operated valve 58 is open and the second and third solenoid-operated valves 60, 66 are closed. Therefore, the cooling medium discharged from the compressor 52 flows through the cooling medium pipes 54b, 54c, the first solenoid-operated valve 58, the exterior heat exchanger 62, and the cooling medium pipe 54b into the second capillary tube 70, and then it flows through the evaporator 32 into the cooling medium pipe 54a, from which the cooling medium flows through the accumulator 56 back to the compressor 52.

Therefore, the high-temperature, high-pressure gas coolant discharged from the compressor 52 is turned to a liquid when the heat thereof is radiated by the exterior heat exchanger 62. The liquid coolant then flows through the second capillary tube 70 in which its pressure is reduced to produce a cooling medium in a gas-liquid phase. This cooling medium is evaporated in the evaporator 32 thereby to cool air that passes through the evaporator 32.

Figure 6:
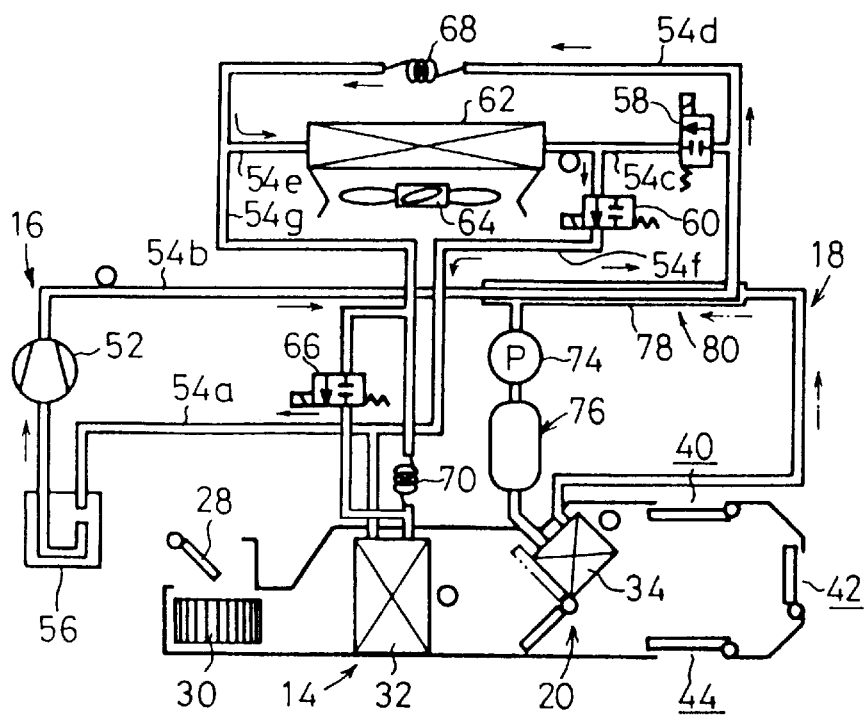
FIG. 6 is a schematic view illustrative of a heating mode (carried out by a heat pump) of the automatic air-conditioning system.

In the heating mode (carried out by a heat pump), as shown in Table 1 and FIG. 6, the first and third solenoid-operated valves 58, 66 are closed, and the second solenoid-operated valve 60 is open. Therefore, the cooling medium discharged from the compressor 52 flows through the cooling medium pipes 54b, 54d into the first capillary tube 68 in which its pressure is reduced to produce a cooling medium in a gas-liquid phase. The cooling medium passes through the exterior heat exchanger 62 and is evaporated, after which the cooling medium passes through the second solenoid-operated valve 60 and the cooling medium pipes 54f, 54a into the accumulator 56, from which the cooling medium flows back to the compressor 52.

In the heating medium circuit 18, the outer conduit 78 of the double-walled medium heat exchanger 80 is supplied with hot water. Consequently, when the high-temperature, high-pressure cooling medium flows through the cooling medium pipe 54b internally with respect to the outer conduit 78, it heats the hot water in the outer conduit 78. The heated hot water is introduced by the water pump 74 into the heater core 34 for thereby heating air that passes through the heater core 34 to a certain temperature.

Figure 7:
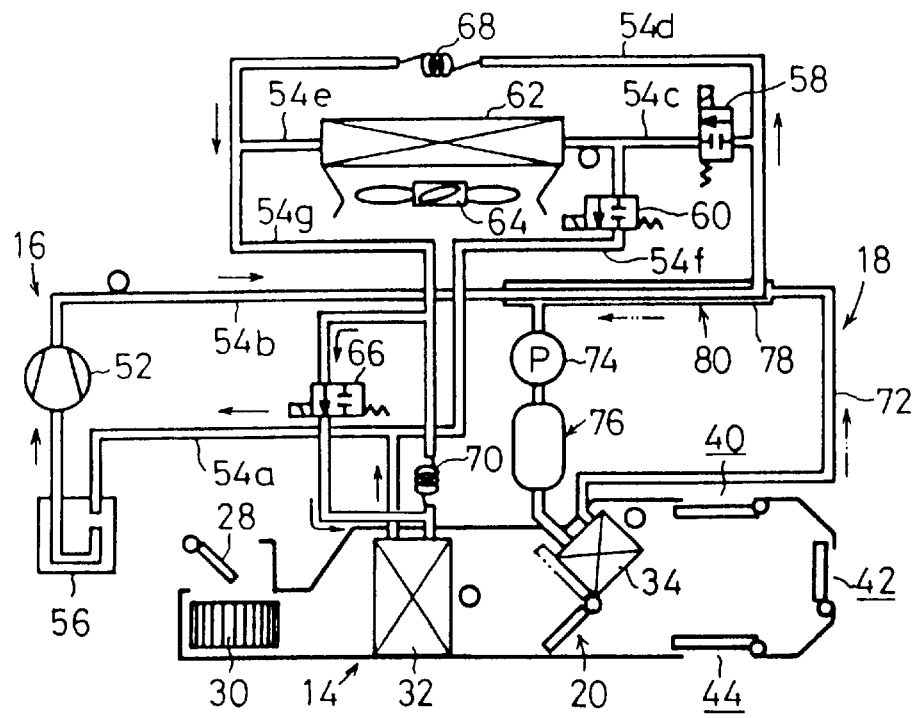
FIG. 7 is a schematic view illustrative of a dehumidifying mode of the automatic air-conditioning system.

In the dehumidifying mode, as shown in Table 1 and FIG. 7, the first and second solenoid-operated valves 58, 60 are closed, and the third solenoid-operated valve 66 is open. Therefore, the cooling medium discharged from the compressor 52 flows through the cooling medium pipes 54b, 54d, the first capillary tube 68, and the cooling medium pipe 54g into the third solenoid-operated valve 66. In the first capillary tube 68, the pressure of a cooling medium is reduced so that it is in a gas-liquid phase. The cooling medium then flows to the evaporator 32, it dehumidifies air that passes through the evaporator 32, and thereafter it flows from the cooling medium pipe 54a through the accumulator 56 back to the compressor 52.

Figure 8:
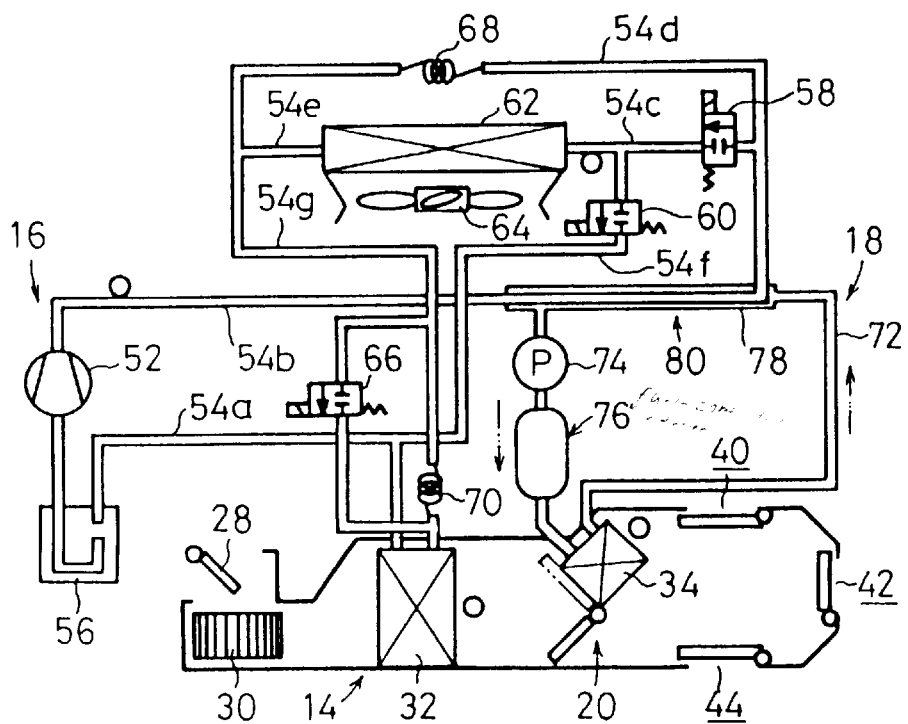
FIG. 8 is a schematic view illustrative of a heating mode (carried out by a fuel-combustion heater) of the automatic air-conditioning system.

In the heating mode (carried out by the fuel-combustion heater), as shown in Table 1 and FIG. 8, the first, second, and third solenoid-operated valves 58, 60, 66 are closed, and the compressor 52 is turned off, so that the automatic air-conditioning system 12 is not operating in an automatic air-conditioning cycle.

The fuel-combustion heater 76 is actuated. shown in FIG. 2, the air blower 90 is rotated by the motor unit 88, and the fuel pump 110 is operated to supply the fuel (kerosene, white gasoline, gas oil, or the like) from the fuel tank 112 through the fuel pipe 108 and one-way valve 106 to the combustion tube 86. The glow plug 104 is energized to ignite the supplied fuel which is combusted together with air that is supplied from the silencer 98 through the inlet pipe 100 by the air blower 90.

The heat exchange passage 92 in the heater case 84 is supplied with hot water from the hot-water circulation pipe 72 through the hot water inlet port 94. The supplied hot water is heated by heat exchange between itself and exhaust gases flowing through the combustion tube 86, and it flows back from the hot water outlet port 96 to the hot-water circulation pipe 72. The hot water heated by the fuel-combustion heater 76 is introduced into the heater core 34, and it heats air passing through the heater core 34 to a certain temperature. After the heat exchange, the exhaust gases are discharged from the combustion tube 86 through the exhaust pipe 102.

In the air blowing mode, the first, second, and third solenoid-operated valves 58, 60, 66 are closed, and the water pump 74 is turned off, as shown in FIG. 1.

Figure 9:
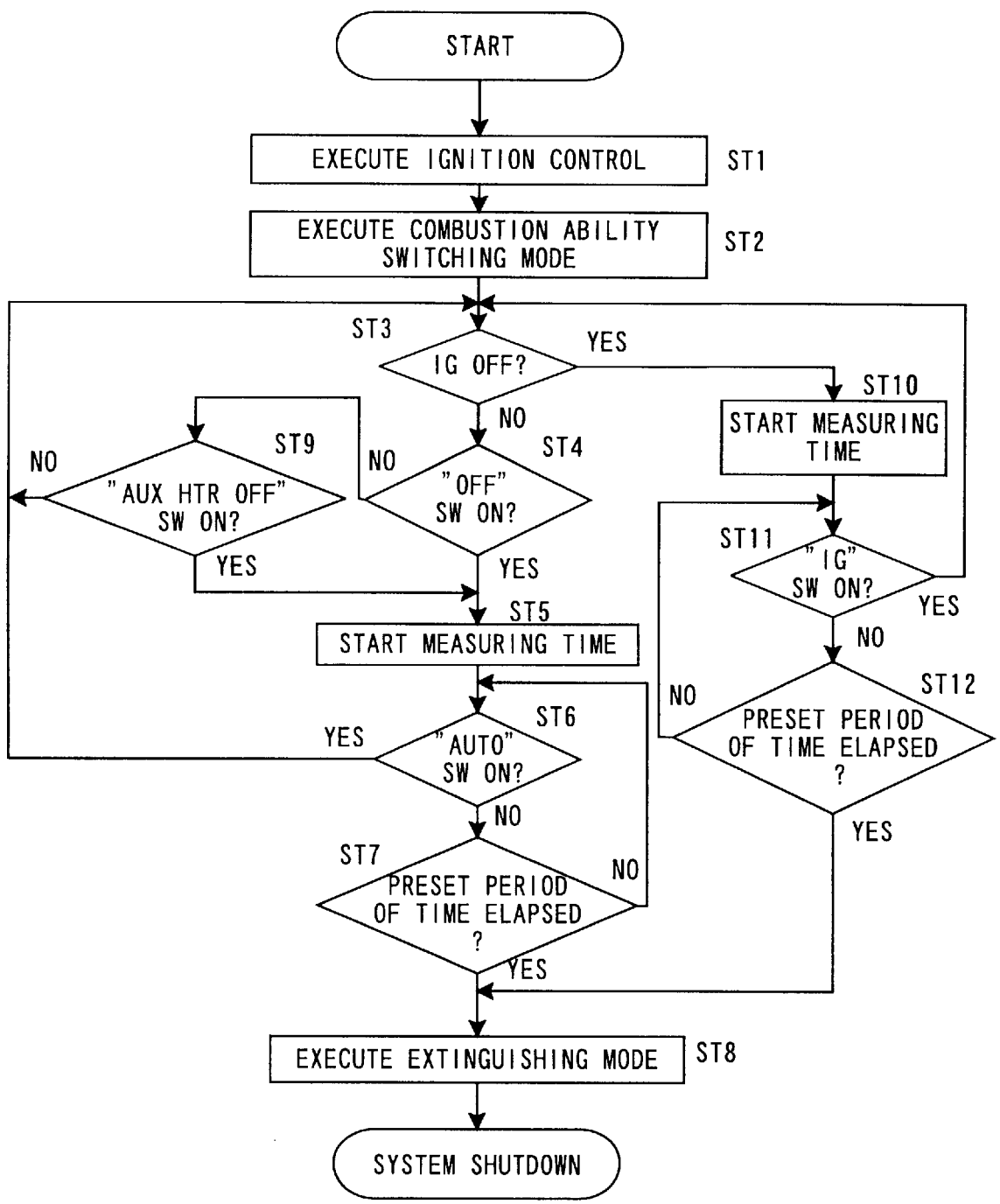
FIG. 9 is a flowchart of an operation sequence of a control method according to the present invention.

A control method according to the present invention will be described below with reference to a flowchart shown in FIG. 9.

When the "AUTO" switch 152 on the control panel 150 is turned on, the automatic air-conditioning ECU 22 reads signals from the ambient air temperature sensor 128, the passenger's compartment temperature sensor 130, and the sunlight intensity sensor 132 of the environmental condition detector 122 and also signals from the water temperature sensor 134, the air temperature sensor 136, the pressure sensor 138, the current sensor 140, and the cooling medium temperature sensor 142 of the operating condition detector 124. The automatic air-conditioning ECU 22 also reads a desired temperature setting $T_{SET}$ which has been entered by the passenger by manually pressing the temperature increasing and lowering switches 156, 158.

Based on the desired temperature setting $T_{SET}$, and the parameters detected by the environmental condition detector 122, i.e., the ambient air temperature $T_{AM}$ detected by the ambient air temperature sensor 128, the passenger's compartment temperature $T_R$ detected by the passenger's compartment temperature sensor 130, and the sunlight intensity $T_S$ detected by the sunlight intensity sensor 132, the automatic air-conditioning ECU 22 calculates a target discharged-air temperature $T_{AO}$ for the air to be discharged into the passenger's compartment according to the following equation (1):

$$T_{AO}=K_{SET} \times T_{SET} - K_R \times T_R - K_{AM} T_{AM} - K_S \times T_S - C \quad (1)$$

where $K_{SET}$, $K_R$, $K_{AM}$, $K_S$ represent coefficients (gains) and C a constant.

A mode of operation of the automatic air-conditioning system 12 is selected on the basis of the calculated target discharged-air temperature $T_{AO}$. If the selected mode of operation is the heating mode (carried out by the fuel-combustion heater), then an ignition control process is carried out in a step ST1 in FIG. 9. In the ignition control process, the fuel in the fuel-combustion heater 76 is automatically ignited as described above with reference to FIG. 2. Then, control proceeds to a step ST2 in which the combustion ability switching mode is carried out. In the combustion ability switching mode, the amount of combustion energy produced by the fuel-combustion heater 76 is continuously controlled in a range from 3000 kcal/h to 6000 kcal/h to heat the passenger's compartment to a certain temperature. While the automatic air-conditioning system 12 is in operation, the fuel-combustion heater 76 is continuously in the combustion ability switching mode.

If the ignition (IG) switch of the electric vehicle is turned on (NO in a step ST3) and the "OFF" switch 154 on the control panel 150 is turned on (YES in a step ST4) in order to de-energize the automatic air-conditioning system 12 in its entirety, then a shutdown signal to temporarily shut down the fuel-combustion heater 76 is entered from the shutdown signal entering means 194, and time starts being measured in a step ST5. If the "AUTO" switch 152 is turned off (NO in a step ST6) and a preset period of time, e.g., 5 seconds, elapses (YES in a step ST7), then the extinguishing control means 192 is energized to extinguish the fuel-combustion heater 76 in the extinguishing mode in a step ST8, whereupon the automatic air-conditioning system 12 is shut down.

If the "OFF" switch 154 is turned off (NO in the step ST4) and the "AUX HTR OFF" switch 176 is turned on (YES in a step ST9) in order to shut down only the fuel-combustion heater 76 while in the combustion ability switching mode, then control goes to the step ST5 in which time starts being measured. After elapse of the preset period of time, the extinguishing control means 192 is energized to extinguish the fuel-combustion heater 76 only. The automatic air-conditioning system 12 can operate to heat the passenger's compartment with a heat pump, or ventilate the passenger's compartment or blow air into the passenger's compartment.

If the ignition (IG) switch is turned off (YES in step ST3), the automatic air-conditioning ECU 22 starts measuring time in a step ST10. If the ignition (IG) switch remains turned off (NO in a step ST11) and if a preset period of time has elapsed (YES in a step ST12), then control goes to the step ST8 in which the extinguishing control means 192 is energized to extinguish the fuel-combustion heater 76.

If the passenger presses the "OFF" switch 154 (YES in the step ST4) or presses the "AUX HTR OFF" switch 176 by mistake (YES in the step ST9), then time starts being measured. If the "AUTO" switch 152 is pressed within the preset period of time (5 seconds) (YES in the step ST6), then the shutdown signal canceling means 196 cancels the shutdown signal, and control goes back to the step ST3 and the combustion ability switching mode is continuously performed. Therefore, even when the passenger accidentally presses the "OFF" switch 154 or the "AUX HTR OFF" switch 176, the fuel-combustion heater 76 will not be extinguished if the passenger presses the "AUTO" switch 152 within the preset period of time.

If the fuel-combustion heater 76 were necessarily extinguished in the extinguishing mode when the passenger presses the "OFF" switch 154 or the "AUX HTR OFF" switch 176, then the fuel-combustion heater 76 would be required to go from the extinguishing mode via the igniting mode to the combustion ability switching mode in order to resume the combustion ability switching mode. Actually, it takes about 4 minutes for fuel-combustion heater 76 to operate in the extinguishing mode, and 2 minutes for fuel-combustion heater 76 to operate in the igniting mode. Therefore, a total of about 6 minutes would be needed before the fuel-combustion heater 76 operate in the combustion ability switching mode again.

According to the illustrated embodiment, however, if the "AUTO" switch 152 is pressed with the preset period of time, then the fuel-combustion heater 76 resumes the combustion ability switching mode immediately without going to the extinguishing mode. Therefore, the temperature in the passenger's compartment is effectively prevented from suffering undue variations, and the automatic air-conditioning system 12 can continuously operate to heat the passenger's compartment.

Furthermore, even when the ignition switch is turned off by mistake while the passenger compartment is being heated by the fuel-combustion heater 76, if the ignition switch is turned on again within the preset period of time (YES in the step ST11), then the fuel-combustion heater 76 resumes the combustion ability switching mode immediately without going to the extinguishing mode. Therefore, the passenger's compartment is continuously heated by the fuel-combustion heater 76.

While the shutdown control means 190 and the extinguishing control means 192 are contained as functions of the fuel-combustion heater ECU 118 in the illustrated embodiment, they may be contained as functions of the automatic air-conditioning ECU 22.

With the method of and apparatus for controlling the vehicular air-conditioning system, as described above, when the passenger presses the "OFF" switch while the fuel-combustion heater is in operation, a shutdown signal to temporarily shut down the fuel-combustion heater is entered. After elapse of a preset period of time, the fuel-combustion heater is extinguished. If a canceling signal to cancel the shutdown of the fuel-combustion heater is entered within the preset period of time, then the shutdown signal is canceled, and the fuel-combustion heater continuously heats the passenger's compartment without being extinguished.

Consequently, even when the passenger presses the switch to extinguish the fuel-combustion heater in error, if the passenger subsequently presses the "AUTO" switch within the preset period of time, the fuel-combustion heater quickly resumes its operation to heat the passenger compartment. As a result, the temperature in the passenger's compartment is effectively prevented from unduly dropping unlike the conventional vehicular air-conditioning system which is required to resume the combustion ability switching mode after the extinguishing mode and the igniting mode.

Although a certain preferred embodiment of the present invention has been shown and described in detail, it should be understood that various changes and modifications may be made therein without departing from the scope of the appended claims.

What is claimed is:

1. A method of controlling a vehicular air-conditioning system to control a fuel-combustion heater for producing combustion heat to heat a heating medium in a heating medium circuit which heats air flowing through a duct having air outlets openable into a passenger compartment, through heat exchange between the heating medium and the air with a heat exchanger disposed in the duct, comprising the steps of:

entering a shutdown signal for temporarily shutting down the fuel-combustion heater;

starting to measure a period of time after said shutdown signal is entered;

enabling entry of a canceling signal for canceling said shutdown signal to cancel the shutdown of the fuel-combustion heater, only if said canceling signal is entered within said period of time; and continuing operation of said fuel-combustion heater if said canceling signal is entered within said period of time, and extinguishing said combustion heater if said period of time expires without the canceling signal being entered.

2. A method according to claim 1, wherein said shutdown signal is entered when a switch for shutting down only said fuel-combustion heater is turned on, or a switch for shutting down the vehicular air-conditioning system in its entirety is turned on, or an ignition switch is turned off.

3. A method according to claim 1, wherein said vehicular air-conditioning system comprises an automatic air-conditioning system.

4. A method according to claim 1, wherein said shutdown signal is input when any one of A) a switch for operating solely said fuel-combustion heater is pressed, B) a switch for operating the air-conditioning system is pressed, or C) an ignition switch for turning off a vehicle engine is actuated.

5. An apparatus for controlling a vehicular air-conditioning system to control a fuel-combustion heater for producing combustion heat to heat a heating medium in a heating medium circuit which heats air flowing through a duct having air outlets openable into a passenger compartment, through heat exchange between the heating medium and the air with a heat exchanger disposed in the duct, comprising:

shutdown control means for temporarily shutting down the fuel-combustion heater; and extinguishing control means for extinguishing the fuel-combustion heat based on a signal from said shutdown control means;

said shutdown control means comprising:

shutdown signal entering means for entering a shutdown signal to temporarily shut down the fuel-combustion heater;

a timer, initiated by said shutdown signal, for measuring a predetermined period of time from entry of said shutdown signal; and shutdown signal canceling means for enabling entry of a canceling signal for canceling said shutdown signal to cancel the shutdown of the fuel-combustion heater, only if the canceling signal is entered within said predetermined period of time after the shutdown signal has been entered, wherein said shutdown control means continues operation of said fuel-combustion heater if said canceling signal is entered within said period of time, and sends a signal to said extinguishing control means to extinguish said combustion heater if said period of time expires without the canceling signal being entered.

6. An apparatus according to claim 5, wherein said shutdown signal entering means comprises means for entering the shutdown signal when a switch for shutting down only said fuel-combustion heater is turned on, or a switch for shutting down the vehicular air-conditioning system in its entirety is turned on, or an ignition switch is turned off.

7. An apparatus according to claim 5, wherein said vehicular air-conditioning system comprises an automatic air-conditioning system.

8. An apparatus according to claim 5, wherein said shutdown signal entering means comprises means for entering said shutdown signal when any one of A) a switch for operating solely said fuel-combustion heater is pressed, B) a switch for operating the air-conditioning system is pressed, or C) an ignition switch for turning off a vehicle engine is actuated.

* * * * *